United States Patent
King et al.

(10) Patent No.: US 8,077,023 B2
(45) Date of Patent: Dec. 13, 2011

(54) OPERATIONAL SIGNAL SYSTEM AND SIGNAL LIGHT ARRANGEMENT

(75) Inventors: Loren J. King, Oregon City, OR (US); Philip M. Hickman, Oregon City, OR (US)

(73) Assignee: Hal's Construction, Inc., Oregon City, OR (US)

( * ) Notice: Subject to any disclaimer, the term of this patent is extended or adjusted under 35 U.S.C. 154(b) by 368 days.

(21) Appl. No.: 12/387,928

(22) Filed: May 8, 2009

(65) Prior Publication Data

US 2010/0283598 A1    Nov. 11, 2010

(51) Int. Cl.
G08B 21/00   (2006.01)
G05B 15/00   (2006.01)

(52) U.S. Cl. .................. 340/431; 340/426.15; 701/50

(58) Field of Classification Search ............... 340/425.5, 340/426.15, 426.22, 426.23, 438, 463, 464, 340/469, 472, 474, 431; 701/50, 84; 700/84; 212/276
See application file for complete search history.

(56) References Cited

U.S. PATENT DOCUMENTS

| | | | |
|---|---|---|---|
| 1,269,246 A | 6/1918 | Anello et al. | |
| 1,284,091 A | 11/1918 | Gore | |
| 1,345,635 A | 7/1920 | Rekersdres | |
| 3,916,377 A | 10/1975 | Demeter | |
| 3,944,972 A | 3/1976 | Chandler | |
| 4,547,844 A * | 10/1985 | Adams | 700/84 |
| 4,861,190 A | 8/1989 | Glassel | |
| 5,208,753 A * | 5/1993 | Acuff | 701/50 |
| 5,546,093 A | 8/1996 | Gudat et al. | |
| 5,575,316 A | 11/1996 | Pollklas | |
| 5,722,790 A | 3/1998 | Spray | |
| 5,730,305 A * | 3/1998 | Ichiba et al. | 212/276 |
| 6,100,795 A | 8/2000 | Otterbacher et al. | |
| 6,405,114 B1 * | 6/2002 | Priestley et al. | 701/50 |
| 6,994,223 B1 * | 2/2006 | Edgar et al. | 212/270 |
| 7,034,666 B2 | 4/2006 | Knutson | |
| 7,672,768 B2 * | 3/2010 | Narisawa et al. | 701/50 |
| 7,684,917 B2 * | 3/2010 | Furuno et al. | 701/50 |
| 2006/0208867 A1 | 9/2006 | McLoughlin et al. | |
| 2008/0258898 A1 | 10/2008 | Yang | |

* cited by examiner

*Primary Examiner* — Van T. Trieu
(74) *Attorney, Agent, or Firm* — Chernoff, Vilhauer, McClung & Stenzel, LLP

(57) ABSTRACT

A visual signal system including a signal display carried prominently on a paving machine, where it can be seen clearly by an operator of a dump truck or shuttle vehicle delivering paving material to the paving machine, as well as by other nearby personnel. Control circuits provide that a paving machine operator may separately control the display of certain signals, while other signals are automatically presented on the signal display in response to operation of paving machine functional controls.

28 Claims, 5 Drawing Sheets

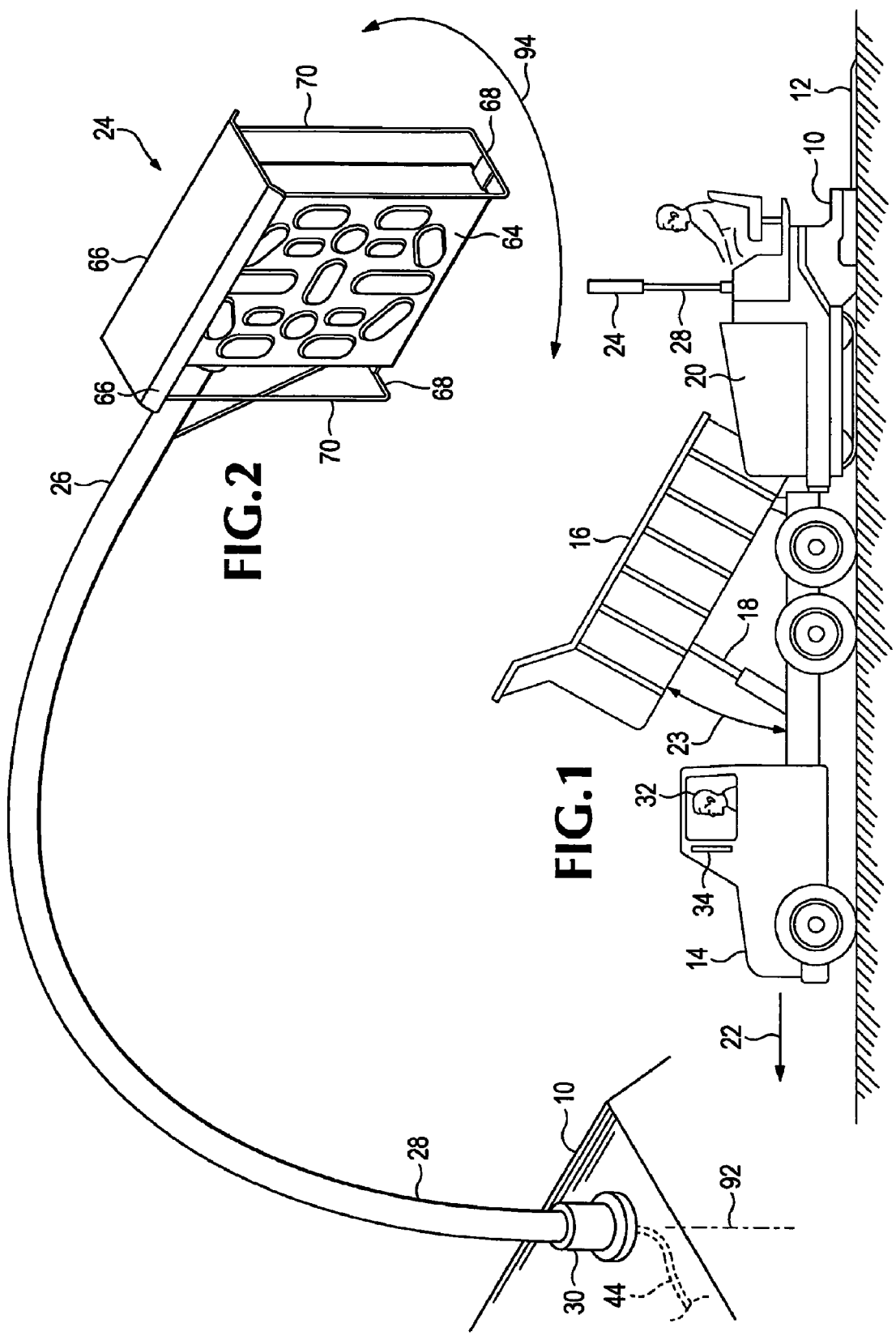

OPERATIONAL SIGNAL SYSTEM AND SIGNAL LIGHT ARRANGEMENT

BACKGROUND OF THE INVENTION

The present application relates to signal apparatus, and in particular relates to a signal system and signal light display system for use by a paving machine operator to provide instructions to an operator of a vehicle delivering a supply of paving materials to the paving machine.

Road paving operations are often carried out at night, in order to reduce the amount of interference with vehicular traffic. Nevertheless, paving operations usually involve noisy machines and trucks, making spoken communication difficult. Paving operations using a paving machine require coordination between the paving machine and paving material supply vehicles in order to minimize interruptions of paving operations.

Paving materials, such as hot mix asphalt concrete, are dumped from a truck or shuttle vehicle, whose operator often cannot see whether or how rapidly material is being discharged, into a receiving hopper of a paving machine. In the past hand signals and shouting have been the principal means of communicating between a paving machine operator and the operator of a dump truck or shuttle providing paving materials to the paving machine, but, because of darkness, hand signals may not be practical during night paving operations. Since voice communication is not dependable because of the ambient noise, and because the dump truck or shuttle vehicle has an obstructed field of view at critical times during paving operations, an improved method of communication is desired, both to improve safety and to improve efficiency of such operations.

SUMMARY OF THE DISCLOSURE

The present disclosure provides a signal system utilizing a signal display carried on a machine such as a paving machine and controlled by the paving machine operator to provide clearly visible and distinctive signals to direct the operator of another vehicle such as a dump truck delivering paving materials to such a paving machine during paving operations. In one embodiment of such a signal apparatus the signal display is located where it is clearly visible, not only to the operator of a dump truck or other supply vehicle delivering materials, but to others in the vicinity of the paving operations, whose safety may depend on knowing what is happening.

In one embodiment of the apparatus disclosed herein a primary portion of the signal display is provided where it may easily be seen by an operator of a supply vehicle, and a corresponding secondary display is located where it is visible to a paving machine operator and to others who are in the vicinity of a paving operation but located where the primary display may not be visible.

In one embodiment of a signal display apparatus as disclosed, signals indicating different instructions are easily distinguished from one another by location, color, sequence or timing, flashing lights, or a combination of one or more of the foregoing.

In one embodiment of signal display apparatus according to the present disclosure a signal display panel is mounted in such a way that it can easily be moved away from its usual location to provide clearance for the paving machine or other machine on which it is carried to pass alongside another vehicle or an obstacle close to the path of the machine.

The foregoing and other features of the invention will be more readily understood upon consideration of the following detailed description taken in conjunction with the accompanying drawings.

BRIEF DESCRIPTION OF THE DRAWINGS

FIG. 1 is a side elevational view of a self-propelled paving machine equipped with an exemplary signal system according to the present invention, and a dump truck, showing the dump truck depositing paving material into a hopper that is part of the paving machine, as the paving machine proceeds to arrange, deposit, and consolidate the paving material to form a roadway.

FIG. 2 is a perspective view of a detail of the paving machine shown in FIG. 1, showing a signal display device which is an embodiment of one aspect of the present invention mounted in an operative position on the paving machine.

DETAILED DESCRIPTION OF PREFERRED EMBODIMENTS

Figure 3:
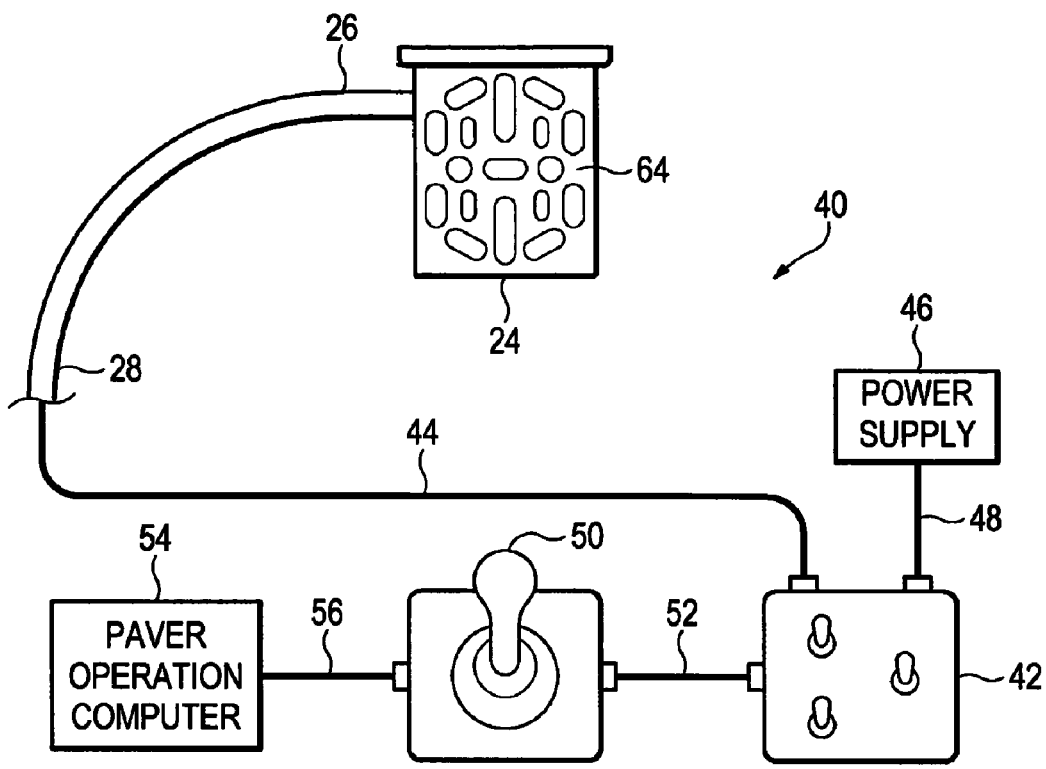
FIG. 3 is a simplified schematic drawing of several functional elements of the signal system shown in FIGS. 1 and 2.

Referring now to the drawings which form a part of the disclosure herein, in FIG. 1 a self-propelled paving machine 10 is shown in operation forming a strip 12 of pavement. A dump truck 14 has its cargo box 16 raised to a tilted position by a hoist 18, so that its load of paving material, such as hot mix asphalt concrete, is delivered into the hopper 20 of the paving machine 10.

During operation of the paving machine 10, such a dump truck 14 or other supply vehicle, such as a shuttle buggy carrying loads of hot mix paving material from a nearby pile (not shown), is closely adjacent to the self-propelled paving machine 10 as it spreads, shapes, and packs the paving material to form the strip 12 of pavement. The self-propelled paving machine 10 may push the dump truck 14 or other supply vehicle along in the direction of the arrow 22 as paving material is discharged from the cargo box 16, or from a cargo-carrying container (not shown), of another type of supply vehicle, into the hopper 20. As the paving material is being discharged from the cargo box 16 into the hopper 20, it may be necessary to operate the hoist 18 to raise the cargo box 16 to increasingly larger tilt angles 23 to cause the paving material to flow into the hopper 20.

When a dump truck 14 arrives at a paving site it must take an appropriate position at some distance such as a few meters ahead of the paving machine 10. It must then back toward the hopper 20 until it is in an appropriate position to operate the hoist 18 to raise the cargo box 16 in order to discharge paving material into the hopper 20.

As may be seen more clearly in FIG. 2, a signal display unit 24 is supported by an arm 26 extending from a post 28 supported on a base 30 mounted on the self-propelled paving machine 10. The arm 26 supports the signal display unit 24 in a position extending laterally outward from a side of the paving machine 10. The display unit 24 is normally clearly in view of an operator 32 of the dump truck 14, who can view the signal display unit 24 in a side mirror 34 on the dump truck 14 despite the presence of the cargo box 16, as the signal display unit 24 is supported far enough outward to one side of the paving machine 10. Although the display unit 24 is shown on the left side of the paving machine 10 it will be understood that it could instead be located on the right side, where it would be visible to the dump truck operator 32 using a mirror 34 on that side of the dump truck 14.

Referring also to FIG. 3, the signal display unit 24 is one element of a signal system 40 mounted on and arranged to operate in conjunction with the self-propelled paving machine 10. The signal system 40 includes a control switch panel 42 interconnected electrically with the display unit 24 through a cable 44, shown schematically in FIG. 3, which conducts electrical power to and from the signal display unit 24 through several electrical conductors, not shown individually.

An electrical power supply 46, which may be a part of the electric power system of the paving machine 10, provides power to various parts of the signal system 40, including the control panel 42 and the display unit 24. A paving machine propulsion system control component, such as a joystick 50, is connected electrically to the control panel 42 to provide desired signals through a cable 52, as will be explained more fully presently. A paving machine operational computer 54 is also connected electrically with the propulsion system control component 50 through a suitable cable 56 or other electrical connection. It will be understood that various cable connections may be facilitated by suitable plugs and sockets which need not be described in detail herein.

Figure 4:
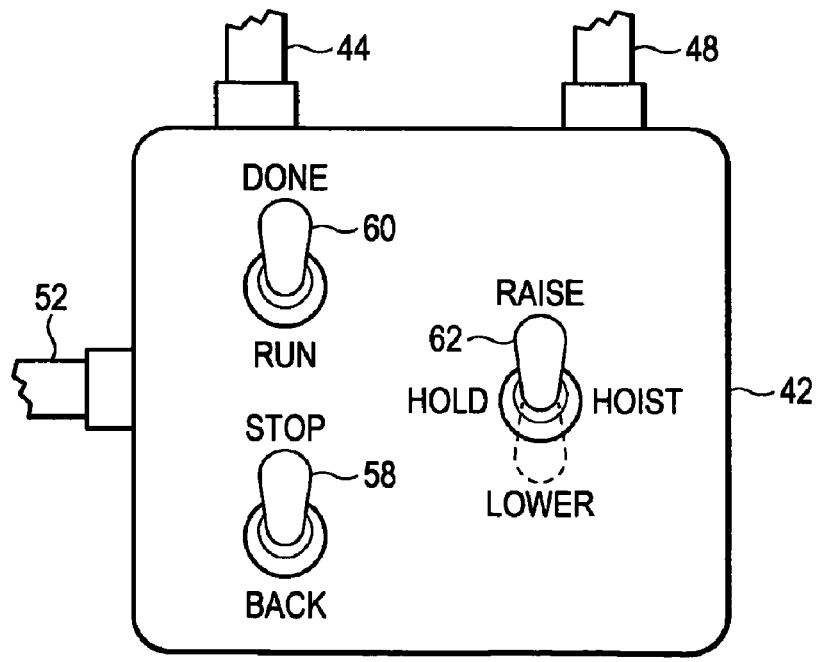
FIG. 4 is a view at an enlarged scale of a control switch panel that is one of the elements of the signal system shown in FIGS. 1-3.

Referring now also to FIG. 4, the control panel 42, in one embodiment of the signal system 40, includes three control switches: a "stop/back" switch 58, a "done/proceed" switch 60, and a "hoist instruction" switch 62.

Figure 5:
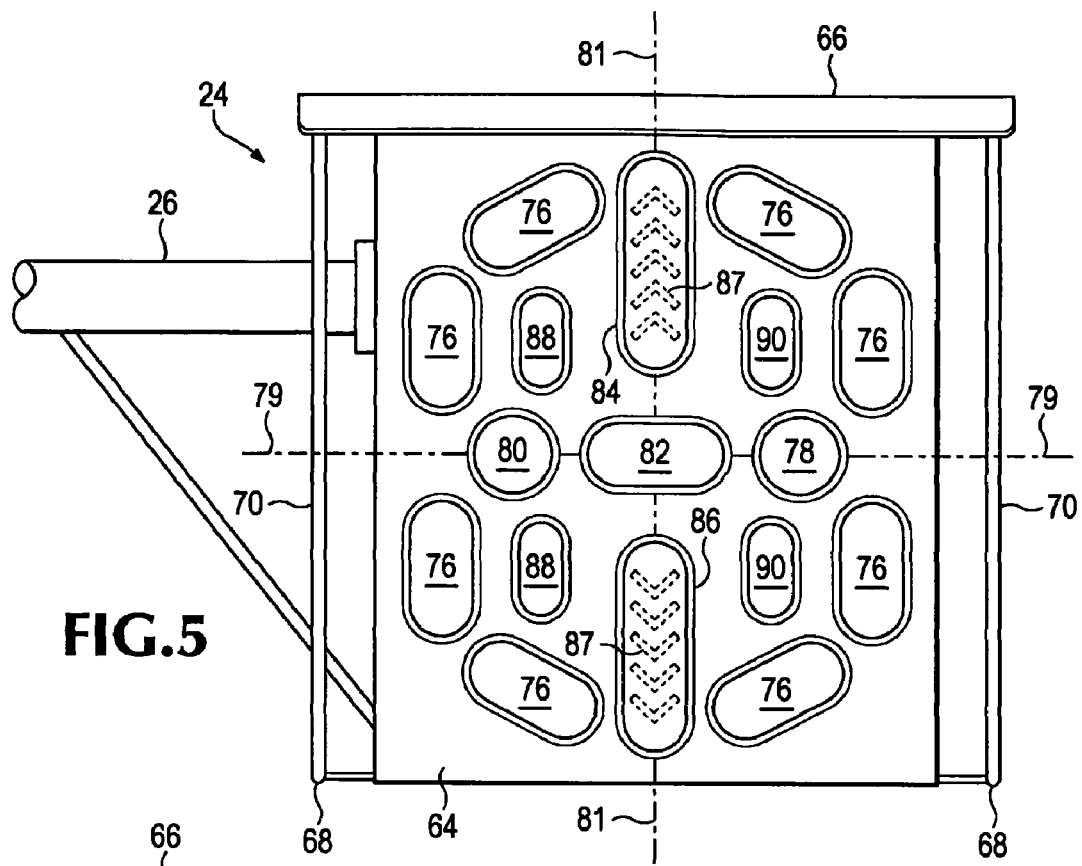
FIG. 5 is an elevational view of the signal display portion of the signal system shown in FIGS. 1-4, showing a side of a display normally visible to the operator of a dump truck or other materials supply vehicle while it is depositing paving material into a paving machine.
Figure 6:
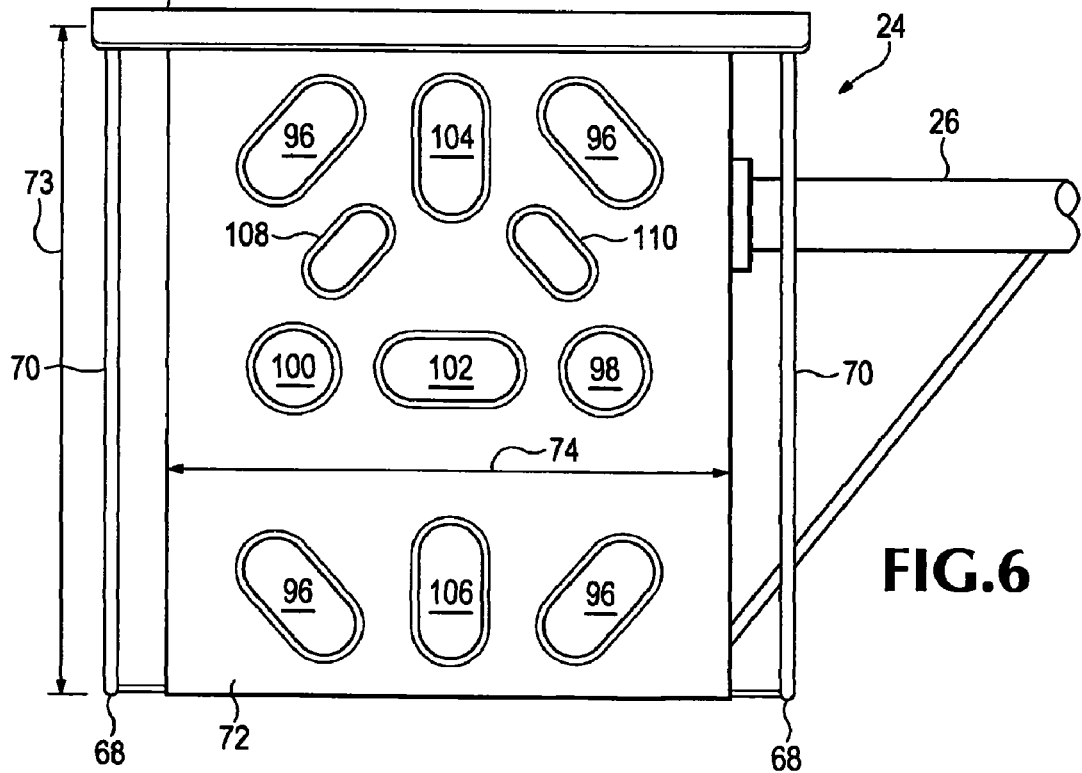
FIG. 6 is an elevational view of an opposite side of the display shown in FIG. 5, which is normally visible to the operator of a paving machine equipped with the signal system shown in FIGS. 1-3.

The signal display unit 24 is shown at a larger scale and in greater detail in FIGS. 5 and 6. The display unit may be of a suitably strong material, such as sheet metal, or a reinforced plastic or other lightweight composite material, with a frame of suitable construction, the details of which are not part of the present invention.

In FIG. 5 a primary display side 64 of the display unit 24 is shown. The primary display side 64 is normally directed toward the dump truck 14 or other materials supply vehicle, and includes several clearly visible indicators. For night-time use of the signal system 40 these indicators should be signal lamps. For use of the system only where there is plenty of ambient light, or where it is convenient to illuminate the signal display unit 24, suitably colored and located mechanical signal elements (not described in detail herein) might be provided instead of the signal lamps. In order to ensure that all signal lamps are visible even when the signal system 40 is being used in bright sunlight conditions, a shade panel 66 extends outward away from the arm 26, on each side of the display unit 24. A pair of horizontal rods 68 may be attached to bottom corners of the signal display unit 24 to support vertical rods 70 extending to outer corners of the shade panels 66. A shade panel 66 may thus also be arranged to provide shade for a secondary display side 72 of the signal display unit 24, as shown in FIG. 6.

The primary display side 64 is large enough to carry a display array of various signal lights that may be located and arranged somewhat as shown in FIG. 5. For example the primary display side 64 may be about 18 inches in its height 73 and about 14 inches in its width 74. The signal lights may be used as will be explained presently to provide clear, unambiguous, signals to the operator 32 of the dump truck 14 or other supply vehicle.

For example, as shown in FIG. 5, a set of eight elongate "stop" signal lamps 76 may be rectangular or oval, for example, and as shown in FIG. 5 may be arranged in four pairs of oppositely located parallel lamps 76, with each lamp 76 being located at a similar distance from a central location on the primary display side 64, so that the signal lamps 76 are located along six sides of an octagon, suggesting the octagonal shape of a highway "stop" sign, although there are no signal lamps 76 oriented horizontally at the tope and bottom.

So long as each stop signal lamp 76 provides ample illumination to be clearly visible, the type of lamp used is not critical, but it has been found that a "stop" signal lamp 76 incorporating several LED lamps arrayed within an oval body as shown in FIG. 5 can provide ample light to be seen clearly under all lighting conditions without requiring more electrical power than is readily available from a conventional electrical power system of a machine such as a self-propelled paving machine 10. The stop signal lamps 76 are preferably equipped with lenses or LED lamps that provide a bright red illumination so as to be easily recognizable as indicating a "stop" signal to the operator 32 of the dump truck 40.

A green signal lamp 78 may located within the octagon defined by the "stop" signal lamps 76 and may be used to provide a "go" or "proceed" signal to the material supply vehicle operator 32, as an indication that the paving machine 10 is moving forward. The "proceed" signal lamp 78 may also comprise a plurality of LED lamps, for example a hexagonal array of seven LEDs, within a suitable body or lens, to provide a bright, clearly visible signal.

A "back-up" signal lamp 80 may be constructed to provide a white light when illuminated, and may also be located within the octagon defined by the "stop" signal lamps 76. In one arrangement of the stop signal lamps 76 the "go" or "proceed" signal lamp 78 and the "back-up" signal lamp 80 are arranged on a horizontal line 79 at mid-height of the lamp array on the primary display side 64, with the "go" signal lamp 78 on one side of a vertical center line 81 and the "back-up" lamp 80 on the opposite side of the vertical center line 81 of the signal lamp array on the primary display side 64.

A set of material off-load signals, such as hoist operation control signal lamps 82, 84, and 86, may be arranged along the vertical center line 81 of the primary display side 64, as shown in FIG. 5. A hoist "hold" signal lamp 82 may be located in the center of the signal lamp array shown on the primary display side 64, a "raise" signal lamp array 84 may be located above the "hold" lamp 82, and a "lower" lamp array 86 may located below the "hold" lamp 82. Each of the "raise" and "lower" arrays 84, 86 may include chevron-shaped sets 87 of LEDs arranged for each such set 87 to be illuminated briefly in sequence, in order to appear as an arrow moving in the direction of desired movement of the cargo box 16, in response to operation of the hoist instruction switch 62.

The hoist "hold" signal lamp 82 may be made to provide a red light to indicate that the hoist should be stopped, while the "raise" array 84 and "lower" array 86 may be equipped to be illuminated with an orange or yellow light that is clearly visible, but not to be mistaken with the red color of the "stop" lamps 76.

In order to provide a clear signal to the operator 32 of the dump truck 14 or other supply vehicle when the entire load of paving material has been received in the hopper 20 of the paving machine 10, a set of "task completed," or "done," lamps 88 and 90 may also be located within the octagonal space defined by the "stop" lamps 76. These "done" lights 88 and 90 may be designed to be illuminated in yet another distinctive color, such as a bright blue color, which also may be provided by a plurality of LEDs in each of the lamps 88 and 90. The "done" lamps 88 and 90 may be illuminated in a flashing, alternating, sequence, to draw the attention of the supply vehicle operator 32 quickly, and to signal the completion of dumping of the load of materials into the hopper 20. The flashing "task completed" signal also instructs the operator 32 to move the dump truck 14 away from the paving machine 10 expeditiously, so as to provide room for a subsequent materials supply vehicle to be positioned where it can provide paving materials to the paving machine 10 with a minimum of interruption of paving operations.

The base 30 of the signal display unit 24 may be constructed and mounted to provide a vertically-oriented pivot axis 92, shown in FIG. 5, about which the post 28 may be rotated as indicated by the arrow 94 in FIG. 2, from the position shown in FIGS. 1 and 2 to a position oriented alongside and parallel with a longitudinal side of the paving machine 10, to keep the display unit 24 from colliding with structures or trees located close to the area being paved. A detent, or a breakaway fastening (not shown), may be incorporated in the base 30 to allow the post 28 to pivot in case of contact with an object, yet ordinarily hold the display unit in a laterally-extending position.

Since the primary display side 64 is normally oriented to face toward the supply vehicle operator 32, and thus away from the paving machine operator 36, the secondary display side 72 shown in FIG. 6 is provided to give the paving machine operator 36 a view of the same signals that are being provided to the supply vehicle operator 32. The secondary display side 72 also provides a display of the same signals being displayed on the principal display side 64, for the benefit of other personnel in the vicinity of the self-propelled paving machine 10. For example, the signals on the secondary display side 72 may alert workers on the ground to the fact that the supply vehicle operator 32 has been instructed to back the dump truck 14 or other vehicle toward the paving machine 10, or to raise or lower the cargo box 16 of the dump truck 14, or that the paving machine 10 is proceeding forward. For that reason the secondary display side 72 may include a plurality of secondary "stop" signal lights 96, a secondary "go" signal light 98, a secondary "back-up" signal light 100, secondary "hold," "raise," and "lower" hoist instruction signals 102, 104, and 106, and a pair of secondary "task completed" or "done" signal lamps 108 and 110, each of which is activated simultaneously with the corresponding signals on the primary display side 64.

The operator 36 of the paving machine provides certain desired instructional signals to the operator 32 of the supply vehicle such as a dump truck 14 by using the control panel 42. Operation of the joystick 50 to place the paving machine 10 into forward motion automatically provides a "proceed" signal, by illumination of the "proceed" or "go" signal lamp 78, using a signal light control circuit incorporated in the signal system 40, such as the circuit shown in FIG. 7. In a paving machine 10 of a type such as a "Lee Boy 8800 Series Asphalt Paver," available from the Lee Boy Company of Denver, N.C., a joystick 50 is connected electrically with the paving machine computer 54 and provides an electrical path through a neutral terminal 112 to a common or ground terminal 114 shown in FIG. 7 when the joystick 50 is in a neutral position in which the paving machine 10 is not moving. As soon as the joystick 50 is moved from the neutral position to a position placing the paving machine 10 into forward movement, the joystick switch 115 is operated to the position shown in broken line, and a circuit is completed through the joystick switch 115 via a "forward" terminal 116 to the ground terminal 114, along the path shown partially in broken line in FIG. 7. Thus, when the paving machine 10 is in forward movement, a circuit is completed from the power supply 46 through the "go" signal lamp 78 on the primary display panel 64 and its counterpart "go" signal lamp 98 on the secondary display 72, so that the operator 32 sees that the paving machine 10 is in motion and that he should release the brakes of the dump truck 14 and place its transmission into a neutral position to allow the paving machine 10 to push the dump truck 14 along as it proceeds forward in the direction of the arrow 22 to form the strip of pavement 12.

Figure 7:
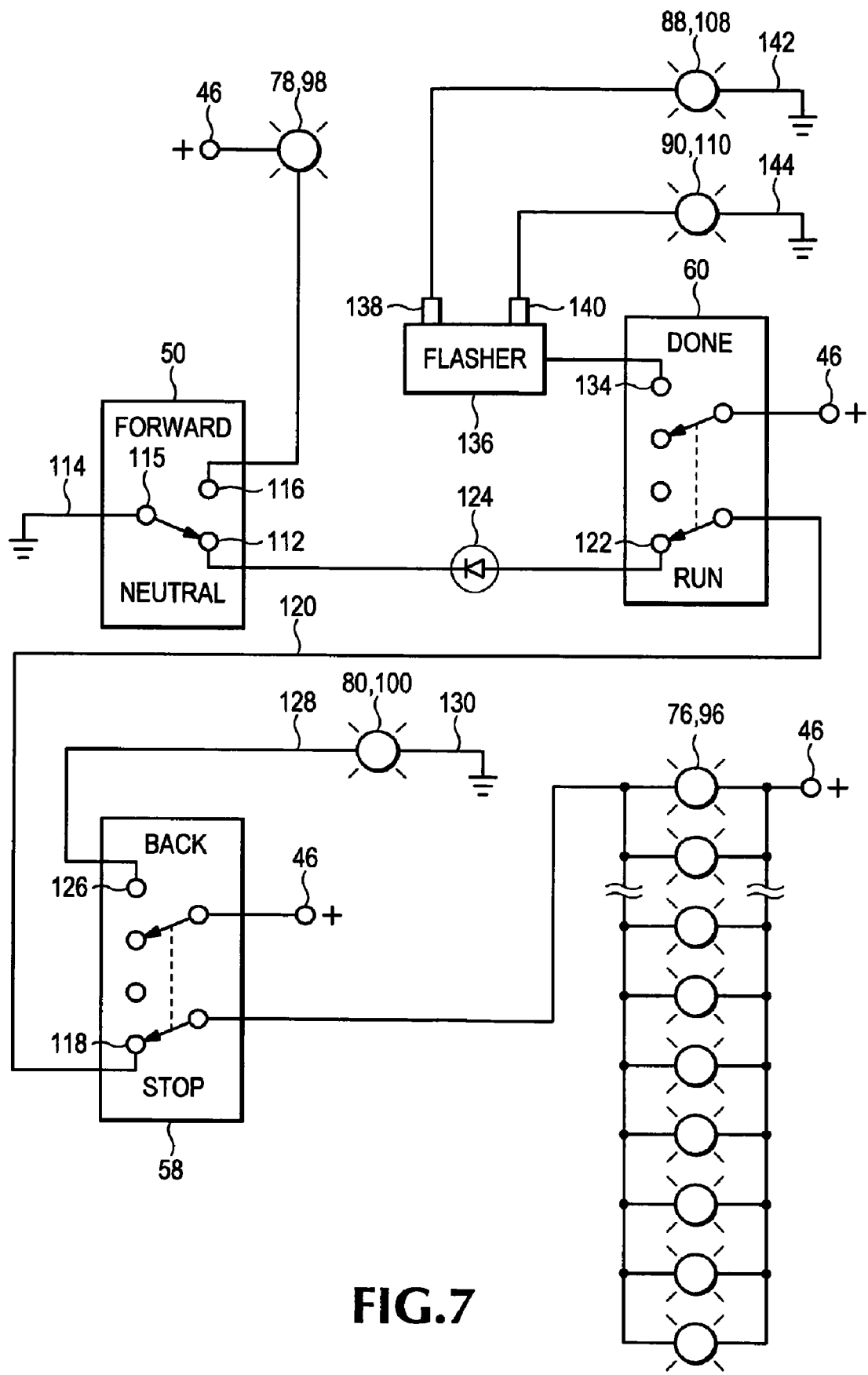
FIG. 7 is a somewhat simplified electrical schematic diagram of a portion of the signal system shown in FIGS. 1-3.

As may be seen in FIG. 7 the "done/run" switch 60 may be a double-pole double-throw switch. Similarly the "stop-back" switch 58 may be a double-pole double-throw switch. Both of the switches 58 and 60 may be biased to be normally in the condition of each shown in FIG. 7, although neither switch need definitely be biased to one position or another. When the switches 58 and 60 are both in the positions shown in FIG. 7, power from the power supply 46 is conducted through the array of "stop" signal lamps 76 of the primary display side 64 and the "stop" signal lamps 96 of the secondary display side 72, and then through the "stop" terminal 118 of the "stop/back" switch 58, through a conductor 120 to the "done-run" switch 60, through a "run" terminal 122 of the switch 60, and thence via a blocking diode 124 to the neutral terminal 112 of the joystick 50 and to the ground terminal 114, to illuminate the "stop" signal lights 76 and 96. The blocking diode 124 prevents the "stop" signal lamps 76 and 96 from being illuminated unintentionally by voltage available at times at the joystick switch 115.

Thus, when either the joystick 50 is moved from the neutral position, or the "done/run" switch 60 is moved to the "done" position, or the "stop/back" switch 58 is moved to the "back" position, the "stop" signal power supply circuit is broken and the arrays of "stop" signal lights 76 and 96 are extinguished.

When the operator 36 of the paving machine 10 wishes to instruct the operator 32 to back the dump truck 14 toward the hopper 20 of the paving machine, he moves the "stop/back" switch 58 to the "back" position. This breaks the power circuit to the "stop" lamps 76 and 96 through one side of the switch 58 and at the same time closes the circuit through the other side of the switch 58, providing a path from the power supply 46 into the switch 58, through the "back" terminal 126 and an appropriate conductor 128 to the "back-up" lamps 80 and 100, and thence to respective ground terminals 130, to illuminate the "back-up" lamps 80 and 100 located respectively on the primary display side 64 and secondary display side 72.

When the paving machine operator 34 moves the "done/run" switch 60 from the "run" position shown in FIG. 7 to the "done" position, the first side of the switch 60 opens the "stop" signal lamp circuit, extinguishing the "stop" signal lights 76 and 96, while the second side of the switch 60 closes an electrical circuit from the power supply 46 to a "done" terminal 134 and thence through an appropriate conductor to a flasher unit 136. The flasher unit 136 may be of any type appropriate for the load imposed by the "done" lamps 88, 90, 108, and 110, and is shown schematically in FIG. 7 in its simplest form, in which it provides power alternatingly to each of a pair of output terminals 138, 140. The output terminal 138 is connected through suitable conductors to the "done" lamps 88 and 108, while the output terminal 140 is connected through suitable conductors to the "done" lamps 90 and 110, and the lamps are connected, respectively, to ground terminals 142 and 144. When the "done/run" switch 60 is moved to the "done" position power is supplied from the power supply 46 through the flasher to illuminate first the "done" lamps 88, 108 and then, and continuing in alternating fashion, the "done" lamps 90 and 110, located respectively on the primary and secondary display sides 64 and 72. Thus when the "done-run" switch 60 is placed into the "done" position the "done" lamps flash alternatingly and the "stop" lamps are extinguished, so that a clear, attention-grabbing signal is presented, instructing the operator 32 of the dump truck 14 to depart.

Figure 8:
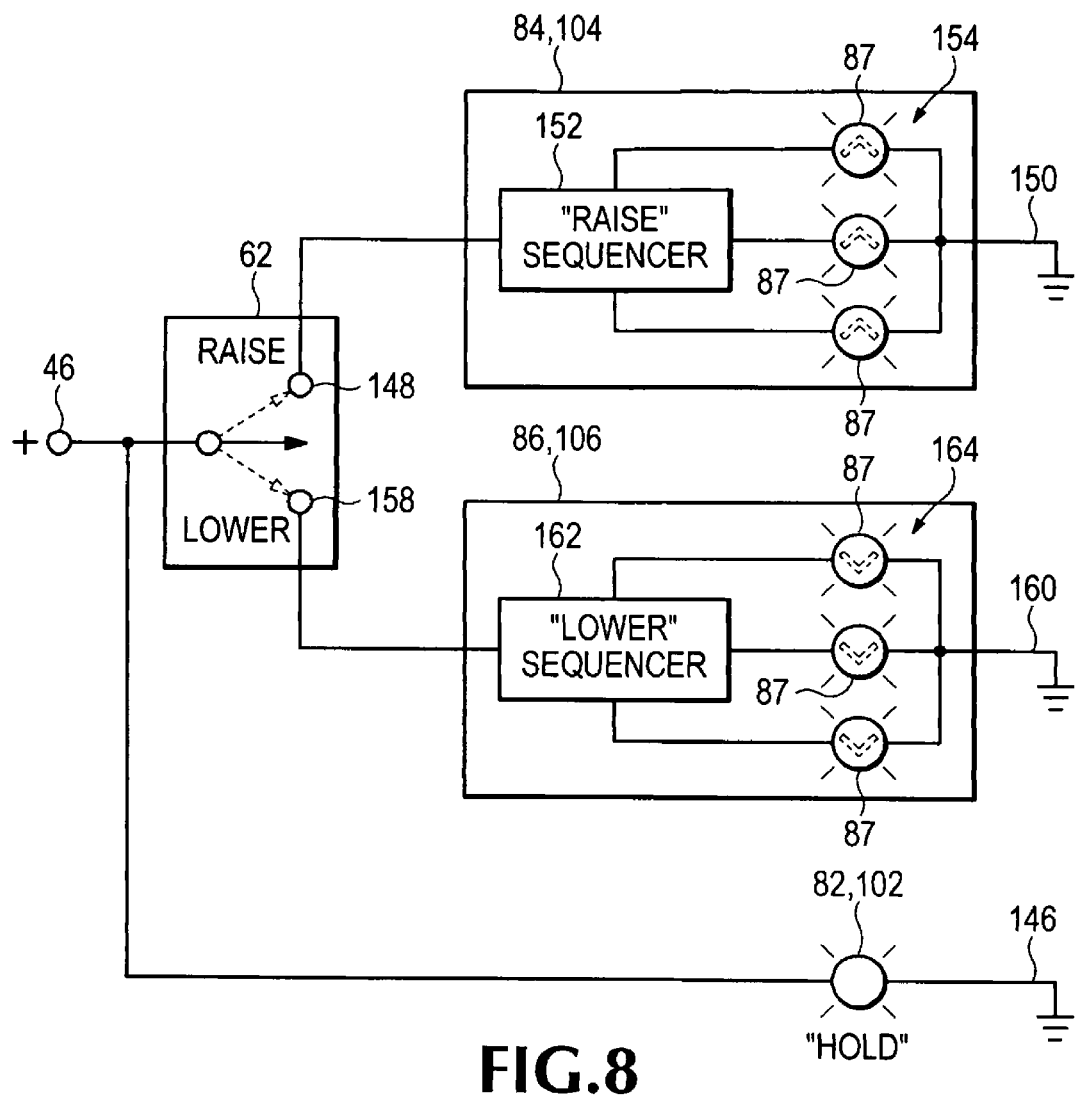
FIG. 8 is a somewhat simplified electrical schematic diagram of another portion of the signaling system shown in FIGS. 1-3.

Referring next to FIG. 8, operation of the hoist instruction switch 62, also present in the control panel 42, is used to instruct the operator 32 when and in which direction to operate the hoist 18 to raise or lower the cargo box 16 of the dump truck 14. The hoist instruction switch 62 may be a single-pole, double-throw switch biased to a neutral, open, condition as shown in FIG. 8. The input terminal 144 is connected by a suitable conductor to the power supply 46. The power supply 46 is also connected through a suitable conductor to the "hold" signal lamps 82, 102 and thence to an appropriate ground terminal 146, so that the hoist "hold" signal lamps 82 are illuminated at any time the power supply 46 is active and connected to the signal system 40.

The hoist instruction switch 62 is operable to either of two positions, a "raise" position and a "lower" position. When the switch is moved to the "raise" position, power is provided to a "raise" terminal 148 connected electrically to the raise arrays 84 and 104 on the primary and secondary display side 64 and 72 of the display unit 24, and thence to respective ground terminals 150. Each "raise" array 84 or 104 may include a sequencer 152 and a set 154 of lamp arrays 87 connected to the sequencer 152, so that the lamp arrays 87 are illuminated momentarily in a sequence proceeding repeatedly from bottom to top, to give a clear indication to the supply vehicle operator that the hoist 18 should be operated to raise the cargo box 16 further. As soon as the switch 62 is moved from the "raise" position, the current to the "raise" terminal 148 is interrupted, and the "hold" signal lamps 82, 102 are then immediately visible as a "hold" signal with no delay between extinguishment of the "raise" signal lamps and illumination of the "hold" signal lamps 82 and 102. The hoist instruction switch 62 is preferably a momentary, or self-canceling switch that is biased to the neutral position shown in FIG. 8.

In a similar fashion, when the hoist instruction switch 62 is operated to the "lower" position, an electrical circuit from the power supply 46 is completed through the "lower" terminal 158 of the switch 62 to the "lower" signal lamp arrays 86 and 106 and to respective ground terminals 160. A sequencer 162 of the "lower" arrays 86 and 106 may be connected electrically to cause a set 164 of lamp arrays 87 to be illuminated momentarily in a sequence appearing to move in a downward direction to provide a clear indication to the operator 32 that the hoist 18 should be operated to lower the cargo box 16.

From the foregoing it can be seen that the signal system 40 disclosed above can be used effectively to provide clearly discernable and unambiguous signals to instruct and inform an operator of a materials supply vehicle or other vehicle being operated in support of a primary machine, as well as other nearby personnel, so as to promote safety and efficient operation of the primary machine in an environment where communication may otherwise be difficult.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A visual signal system comprising:
    (a) a "stop" signal light;
    (b) a "proceed" signal light; and
    (c) a "hoist operation" signal light set, including:
        (i) a "raise" signal light; and
        (ii) a "lower" signal light; and wherein
    (d) the signal lights are all mounted on a primary display unit carried on a self-propelled machine requiring a supply of material and in a location calculated to be visible to an operator of a supply vehicle delivering said supply of material to the self-propelled machine, and wherein the signal system includes a control panel adapted for use by an operator of said self-propelled machine in using said primary display unit to direct said operator of said supply vehicle.

2. The signal system of claim 1 wherein the hoist control signal light set includes a "hold" signal light.

3. The signal system of claim 1 wherein said primary display unit further includes a "back-up" signal light.

4. The signal system of claim 1 wherein said primary display unit further includes a "task completed" signal light.

5. The signal system of claim 1 including a "back-up" signal light and a "task completed" signal light in said primary display unit, and an electrical control circuit arranged to provide power selectively to illuminate either said "back-up" signal light or said "task completed" signal light and to prevent both from being illuminated simultaneously.

6. The signal system of claim 1 including an electrical control circuit arranged to illuminate said "proceed" signal light in response to operation of a propulsion control of said machine so as to place said machine into forward motion.

7. The signal system of claim 1 wherein said primary display unit is mounted at a side of said machine.

8. The signal system of claim 1 wherein said "stop" signal light and "proceed" signal light and "hoist operation" signal light set mounted on said primary display unit are displayed facing in a first direction with respect to said machine, toward an operator of a supply vehicle being operated in cooperation with said machine.

9. The signal system of claim 8 including a secondary signal display corresponding to said primary signal display and including a secondary "stop" signal light, a secondary "proceed" signal light, and a secondary "hoist operation" signal light set, said secondary signal display being located in a position calculated to be visible to an operator of said machine.

10. The signal system of claim 8 including a secondary signal display of signal lights corresponding to said "stop," and "proceed," signal lights and "hoist operation" signal light set, located in a position visible to personnel who are near said machine but in locations where said primary signal display may not be visible.

11. The signal system of claim 1 wherein said "raise" signal light and "lower" signal light are controlled by a self-canceling momentary switch.

12. The signal system of claim 1 including a "back-up" signal light and wherein said "stop" signal light and said "back-up" signal light are connected electrically to extinguish said "stop" signal light when said "back-up" signal light is illuminated, and including a switch biased to illuminate said "stop" signal light unless said "back-up" signal light is illuminated or said machine is placed into forward motion.

13. The signal system of claim 1 including a control panel located at a machine operator station remote from said primary display unit.

14. The signal system of claim 1 wherein said "stop" signal light and said "proceed" signal light are controlled by a signal control circuit responsive to a machine propulsion control device in such a way that when said machine propulsion control device is in a neutral position said "stop" signal light is illuminated and when said machine propulsion control device is in a "forward" position said "proceed" signal light is illuminated and said "stop" signal light is extinguished.

15. The signal system of claim 1 wherein said "stop" signal light includes a plurality of separate elongate elements displayed prominently and arranged so as to outline a polygon.

16. In combination with a self-propelled paving machine, a signal display apparatus comprising:
    (a) a primary signal display mounted on said paving machine and including a "stop" signal, a "proceed" signal, and a "material off-load" signal set, each of said signals and said signal set being clearly visible and distinctive to an operator of a separate vehicle operated in support of said paving machine;
    (b) a signal controller located at an operator station of the paving machine so as to be within reach of an operator of the paving machine, said signal controller including a plurality of switches connected electrically to cause the primary signal display to show a selected one of said "stop," "proceed," and "material off-load" signals.

17. The combination of claim 16 wherein said signal display apparatus includes a first signal control circuit responsive to a propulsion control device of said paving machine so as to activate said "proceed" signal in response to placement of said paving machine propulsion control device into a "forward" position.

18. The combination of claim 16 including a second signal control circuit interconnected with said signal controller and operative selectively to cause said primary signal display to display a signal from said "material off-load" signal set, and wherein said "material off-load" signal set indicates that a mechanism on a supply vehicle should be operated to begin or stop discharging material from said supply vehicle.

19. The combination of claim 16 wherein said signal display apparatus includes a third control circuit interconnected with said signal controller and arranged to cause the primary display unit selectively to display a "task completed" signal.

20. The combination of claim 19 wherein said third control circuit is interconnected with said signal controller so as to prevent said primary display unit from activating said "stop" signal during display of said "task completed" signal.

21. The combination of claim 19 wherein said "task completed" signal includes a plurality of distinctive lights.

22. The combination of claim 21 including a flasher connected to said lights of said "task completed" signal to cause different ones of said plurality of lights to flash alternatingly.

23. The combination of claim 19 including a fourth control circuit connected electrically with said signal controller so as to selectively activate a "back-up" signal and to deactivate the "stop" signal.

24. The combination of claim 23 wherein said "back-up" signal includes a white light.

25. The combination of claim 23 wherein said fourth control circuit includes a switch connected electrically so as to prevent simultaneous display of both said "back-up" signal and said "proceed" signal.

26. The combination of claim 16 wherein said "stop" signal includes a combination of lights arranged to be significantly more prominent than any other signal light in said primary display unit.

27. The combination of claim 26 wherein said "stop" signal includes a plurality of lights arrayed to define a polygon resembling an outline of a highway "stop" sign.

28. The combination of claim 16 including a secondary signal display carried on said paving machine and directed toward said operator station so as to be in view of an operator of said paving machine, said secondary signal display being arranged to display a signal corresponding with each signal that is displayed by said primary signal display.

* * * * *